Oct. 15, 1940.   H. M. KNOTH   2,217,867
WHEEL
Filed April 15, 1939
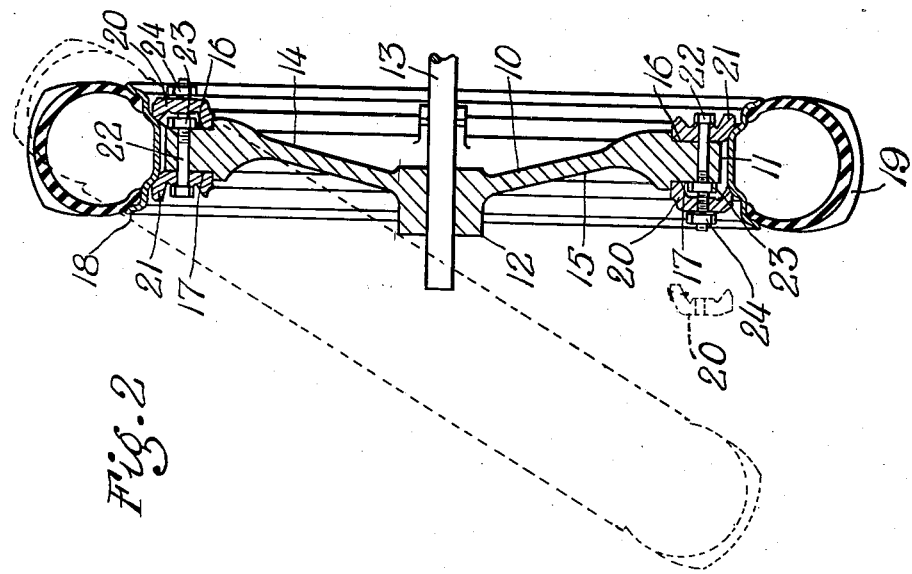
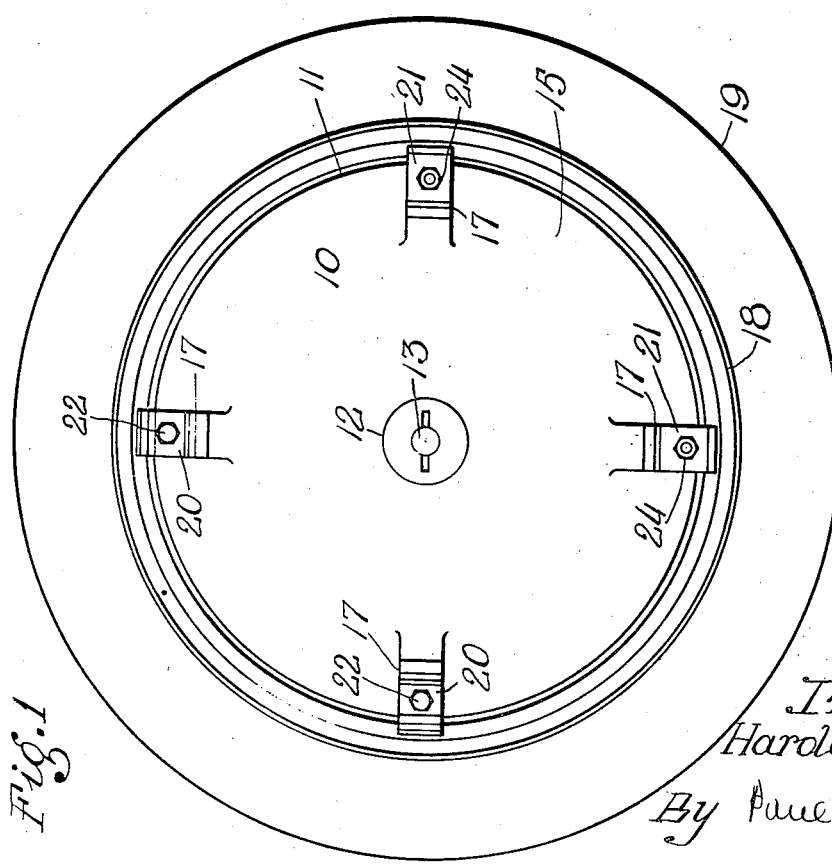
Inventor
Harold M. Knoth
By Paul C. Pippel
Atty.

Patented Oct. 15, 1940

2,217,867

UNITED STATES PATENT OFFICE 2,217,867

WHEEL

Harold M. Knoth, Chicago, Ill., assignor to International Harvester Company, a corporation of New Jersey Application April 15, 1939, Serial No. 268,137

6 Claims. (Cl. 301—20)

This invention relates to a wheel, and more particularly to the type carrying a demountable rim. Still more particularly the invention relates to an improved rim clamping means for mounting the rim on the wheel and permitting removal of the rim from the wheel at either side thereof.

The particular type of wheel in which the invention contemplates the use of the improved clamping means is that type of wheel utilized in agricultural tractors having adjustable treads. The manner of obtaining a plurality of treads in a tractor having such wheels includes the use of wheels of the "convex" type; that is, wheels having their peripheral rim-carrying portions axially offset with respect to the plane of the hub portions. Such a wheel gives at least two positions on the axle and in some instances, the wheel is provided with a hub permitting axial adjustment of the wheel on the tractor axle. A problem often arises when it becomes necessary to remove the tire-carrying rim from the wheel without first removing the wheel from the tractor because the location of the rim-supporting means changes from inside to outside as the position of the wheel is reversed. In the event that all removable rim clamps or lugs are carried at one face of the wheel, it follows that the rim may be removed from the wheel at only that side; and it follows from that, that, if the wheel is on the tractor with the removable lugs facing the tractor body, the tire and rim must necessarily be removed from that side, but the rim and tire cannot be entirely removed, since they still encircle the tractor axle.

The principal object of the present invention, then, is to provide a wheel assembly comprising a wheel and a pneumatic tire-carrying rim and having improved rim-clamping means which permits removal of the rim from the wheel at either side thereof.

An important object of the invention is to mount the improved clamping means on the wheel in a manner that facilitates mounting and demounting the rim by eliminating the handling of numerous parts.

Another important object is to provide an improved wheel assembly in which only certain of the clamping means must necessarily be removed before the rim may be removed from the wheel.

These and other desirable objects are achieved in one preferred form of the invention as illustrated herein in which the improved wheel assembly comprises a wheel adapted to carry a demountable pneumatic tire-carrying rim. A plurality of rim clamp or supporting means is provided on the wheel and comprises a plurality of pairs of rim clamps circumferentially spaced about the wheel periphery for engaging the rim. Each pair of rim clamps includes a clamp normally fixed on the wheel and a clamp removable from the wheel independently of the first clamp. These pairs of clamps are arranged about the periphery of the wheel with certain consecutive removable clamps disposed within 180 degrees of the wheel periphery at one wheel face and with the other removable clamps disposed within the other 180 degrees of the wheel periphery at the other wheel face. With the clamps arranged in this manner, it is necessary only to remove certain of the removable clamps in order to demount the rim and this may be done from either side of the wheel, as desired.

A more complete understanding of the objects and desirable features of the invention may be had from the accompanying sheet of drawing, in which:

Figure 1 is an elevational view of the improved wheel assembly; and,

Figure 2 is a vertical sectional view of the same.

The wheel chosen for the purpose of illustration and shown at 10 is of the disk type having a peripheral portion 11, although it will be understood that the invention may be aptly applied to a wheel of the spoke-end type. The wheel 10 is of the "convex" type in which the plane of the peripheral portion 11 is axially offset with respect to the plane of a central hub portion 12. The hub 12 may be of the adjustable type, adjustably carried on a vehicle axle, as at 13.

The particular wheel illustrated is of the type having a peripheral portion of uniform diameter, and the wheel has opposite faces 14 and 15 which become inboard or outboard, or inner or outer, faces, depending upon the position of the wheel as utilized on the vehicle. The wheel is formed at each face 14 and 15 with clamp or lug receiving pockets 16 and 17, respectively, there being four at each side in the present instance. The wheel is adapted to carry a demountable rim 18 preferably of the semi-drop-center type, which in turn carries a pneumatic tire 19. This rim is held in place by the improved rim-supporting or clamping means presently to be described.

The rim-clamping means consists of a plurality of pairs of rim clamps or lugs 20 and 21 disposed about the wheel at its peripheral portion respectively in the clamp-receiving seats 16. Each pair of clamps is held in place by a single securing means in the form of a headed bolt 22, which is passed through one clamp and the wheel, and which has a nut 23 threaded thereon to mount one of the clamps independently of the other. The other clamp is fitted over the bolt in rim-supporting position and is held in place by a second nut 24 threaded on the bolt 23, the means of mounting the clamps thus permitting removal of the second clamp independently of the first clamp, which remains in position on and normally fixed with respect to the wheel.

The pairs of clamps are arranged about the periphery of the wheel 10 and are received by the seats 16 and 17 in a manner that disposes consecutive, normally fixed clamps at one face of the wheel within different halves of the wheel periphery and at opposite sides. Specifically, as best shown in Figure 1, each of the two seats 17 at the wheel face 15 and located within 180 degrees of the wheel periphery is adapted to receive a clamp or lug 20. These lugs are secured to the wheel 10 by the bolts 22 and nuts 23. At the opposite face of the wheel and in the seats 16 corresponding to the two seats 17, there are disposed two of the lugs or clamps 20, which are removably held in place on the bolt 22 by the nuts 23. From this portion of the description, it will be seen that two of the removable lugs are located at the wheel face 14 within 180 degrees of the wheel periphery. The remaining two pairs of seats 16 and 17 are located within the other 180 degrees of the wheel periphery and are adapted to receive the other two pairs of lugs 20 and 21, but in positions reversed from those of the lugs previously described. The second pair of lugs is mounted on the wheel with each of the lugs 21 securely mounted or normally fixed with respect to the wheel at the face 14, being held in place by bolts 22 and the nuts 23. The two removable lugs 20 are thus disposed at the other face 15 of the wheel and are removably carried by the bolts 22 through the medium of the nuts 24. Thus, it will be seen that certain of the removable lugs 20 are consecutively arranged at one wheel face within 180 degrees of the wheel periphery and the remaining removable lugs 20 are similarly arranged at the other wheel face and within the other 180 degrees of the wheel periphery.

The improved rim-clamping means and manner of mounting the same, as previously described in detail, permits removal of the rim and tire 18 and 19 from either side of the wheel 10. This removal is diagrammatically illustrated in dotted lines in Figure 2. Should it become desirable to remove the tire and rim from the wheel at the wheel face 15, referring to Figure 2, the two removable lugs at that wheel face are first removed, the cooperating lugs or clamps 21 remaining normally fixed on the wheel. In most instances, with these lugs 20 removed, it is necessary merely to swing the tire and wheel outwardly away from the wheel, as illustrated in dotted lines, thus releasing the rim from the other clamps and permitting complete removal thereof. In other instances, it may be necessary merely to loosen the nuts 24 holding the other clamps 20 in order to accomplish removal of the rim. In either event, the procedure is quickly and easily performed. Should the wheel be mounted on the vehicle axle 13 such that the wheel face 14 is disposed outwardly, the rim and tire may be removed at that face by application of the previously described procedure to the removable lugs 20 located at that face.

It will be understood that the foregoing description pertains to only a preferred embodiment of the invention, in the construction and use of which it will be further understood that numerous modifications and alterations may be made without departing from the spirit and scope of the invention as defined in the appended claims.

What is claimed is:

1. A wheel assembly comprising a wheel having opposite faces, a demountable rim carried thereon, a plurality of pairs of rim-supporting clamps disposed about the wheel periphery and mounting the rim, and a securing means including a single bolt for each pair of clamps for securing the respective pair of clamps to the wheel, one clamp of each pair being removable independently of the other, certain of the first-named, independently removable clamps being secured at one face of the wheel and others at the other face of the wheel to permit removal and installation of the rim from the wheel at either side.

2. A wheel assembly comprising a wheel having opposite faces, a demountable rim, and a plurality of rim-supporting means disposed about the periphery of the wheel, each of said means including a pair of rim clamps disposed at opposite faces of the wheel, and a securing means including a single bolt for securing said clamps to the wheel, said securing means serving to secure one of the clamps in position and to mount the other for removal independently thereof, the plurality of means being arranged about the wheel with certain of the secured clamps disposed consecutively within one-half of the wheel periphery at one wheel face and the remainder of the secured clamps within the other half of the wheel periphery at the other wheel face, the removable clamps being thereby arranged at opposite sides of the wheel to permit removal of the rim from either face of the wheel.

3. A wheel assembly comprising a wheel having opposite faces, a demountable rim, a plurality of rim-supporting clamps secured at one face of the wheel within one-half of the wheel periphery, a second plurality of rim-supporting clamps secured at the opposite wheel face within the other half of the wheel periphery, and a plurality of removable rim-supporting clamps carried respectively at opposite faces of the wheel and cooperating respectively with the aforesaid clamps to mount the rim on the wheel, said last named clamps being removable to dismount the wheel while the other clamps remain secured to the wheel.

4. A wheel assembly comprising a wheel having inner and outer faces, a demountable rim, a plurality of rim-supporting clamps disposed at the inner wheel face within one-half of the wheel periphery, a plurality of bolts respectively securing the clamps in position, a plurality of clamps carried respectively by the bolts at the outer wheel face and removable independently of the first clamps, and a plurality of pairs of clamps similarly carried by the wheel within the other half of its periphery, the removable clamp of each of said last pairs being disposed at the inner wheel face.

5. A wheel assembly comprising a wheel having opposite faces, a demountable rim, a plurality of rim-supporting clamps secured at one face of the wheel within 180 degrees of the wheel periphery, a second plurality of rim-supporting clamps secured at the opposite wheel face within the other 180 degrees of the wheel periphery, and a plurality of removable rim-supporting clamps carried respectively at opposite faces of the wheel and cooperating respectively with the aforesaid clamps to mount the rim on the wheel, said last named clamps being removable to dismount the wheel while the other clamps remain secured to the wheel.

6. A wheel assembly comprising a wheel having opposite faces, a demountable rim carried on the wheel, and a plurality of rim-clamping means spaced circumferentially about the wheel and engaging the rim, each clamping means including a clamp normally fixed on the wheel and a cooperating clamp removable from the wheel, said means being arranged about the wheel with consecutive removable clamps within 180 degrees of the wheel periphery at one wheel face and with other removable clamps consecutively arranged at the other wheel face within the other 180 degrees of the wheel periphery.

HAROLD M. KNOTH.